US012669960B2

(12) United States Patent (10) Patent No.: US 12,669,960 B2
Peterson et al. (45) Date of Patent: Jun. 30, 2026

(54) HOST-SPECIFIC EVENT NOTIFICATION REGISTRATION

(71) Applicant: International Business Machines Corporation, Armonk, NY (US)

(72) Inventors: Beth Ann Peterson, Tucson, AZ (US); Matthew Richard Craig, Sahuarita, AZ (US); John G. Thompson, Tucson, AZ (US); John R. Paveza, Morgan Hill, CA (US); Nicolas Marc Clayton, Warrington (GB); Terry O'Connor, High Peak (GB); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 17/958,394

(22) Filed: Oct. 1, 2022

(65) Prior Publication Data

US 2024/0111450 A1 Apr. 4, 2024

(51) Int. Cl.
G06F 3/06 (2006.01)
(52) U.S. Cl.
CPC .......... G06F 3/0658 (2013.01); G06F 3/0644 (2013.01); G06F 3/0607 (2013.01); G06F 3/0679 (2013.01)
(58) Field of Classification Search
CPC .... G06F 9/542; G06F 16/1734; G06F 3/0658; G06F 3/0644; G06F 3/0607;
(Continued)

(56) References Cited

U.S. PATENT DOCUMENTS 7,707,586 B2 * 4/2010 Smith ..................... G06F 21/57
719/318
8,745,245 B1 * 6/2014 Bullock .............. H04L 43/0811
709/227
(Continued)

OTHER PUBLICATIONS

Disclosed Anonymously, "A Method to Provide Adapter Events Notification to the OS in a Logical Partitioning Environment," An IP.com Prior Art Database Technical Disclosure, IPCOM000146958D, Feb. 28, 2007.
(Continued)

*Primary Examiner* — Khoa D Doan
(74) *Attorney, Agent, or Firm* — James L. Olsen

(57) ABSTRACT

A computer-implemented method for effectively delivering notifications in data storage environments includes, receiving, by a storage controller from a host system, a request to register the host system with the storage controller to receive notifications. These notifications may be associated with a selected type of event detected by the storage controller. In certain embodiments, the selected type of event is a space-related condition associated with a particular storage resource controlled by the storage controller. The computer-implemented method registers the host system with the storage controller. In response to detecting an event of the selected type on the storage controller, the computer-implemented method transmits a notification from the storage controller to the host system to provide notice of the event. A corresponding system and computer program product are also disclosed.

17 Claims, 8 Drawing Sheets

(58) Field of Classification Search
CPC .... G06F 3/0679; G06F 3/0659; G06F 3/0653;
G06F 3/0617; G06F 3/067; G06F 3/0605;
G06F 2201/86; G06F 11/3072; G06F
11/3034; H04L 41/106
USPC ........................................................ 719/318
See application file for complete search history.

(56) References Cited

U.S. PATENT DOCUMENTS

| | | | |
|---|---|---|---|
| 9,002,997 B2 | 4/2015 | Kowalski et al. | |
| 9,071,609 B2 | 6/2015 | Khandekar et al. | |
| 10,795,708 B1 * | 10/2020 | Grechishkin | ........... G06F 3/061 |
| 2005/0193394 A1 * | 9/2005 | Benhase | ................. G06F 9/542 |
| | | | 719/318 |
| 2011/0173350 A1 * | 7/2011 | Coronado | ............. G06F 13/385 |
| | | | 711/E12.001 |
| 2021/0382856 A1 * | 12/2021 | Hsu | ..................... G06F 16/1847 |
| 2021/0385144 A1 * | 12/2021 | Rauenbuehler | ..... H04L 12/2825 |

OTHER PUBLICATIONS

Disclosed Anonymously, "Method to optimize resource requirement for OSGi application in cloud," An IP.com Prior Art Database Technical Disclosure, IPCOM000226038D, Mar. 21, 2013.
Disclosed Anonymously, "Collaborative Scheduling," An IP.com Prior Art Database Technical Disclosure, IPCOM000240244D, Jan. 15, 2015.
Disclosed Anonymously, "Resource management efficacy in the multi-tenant cloud application," An IP.com Prior Art Database Technical Disclosure, IPCOM000264250D, Nov. 25, 2020.
IBM, "IBM Aix Dynamic System Optimizer Version 1.1," available at https://www.ibm.com/docs/en/ssw_aix_72/systemoptimizer/systemoptimizer_pdf.pdf, 2012.
SAP, "Event Notifications in SAP Cloud for Customer," available at https://help.sap.com/doc/644b52b59f8b4010a2ded6a028c0aab8/CLOUD/en-US/EventNotifications.pdf, Jul. 23, 2022.

* cited by examiner

100

| Computer 101 |
|---|
| Processor Set 110 |
| Processing Circuitry 120     Cache 121 |
| Communication Fabric 111 |
| Volatile Memory 112 |
| Persistent Storage 113 |
| Operating System 122     Event Notification Registration Module 150 |
| Peripheral Device Set 114 |
| UI Device Set 123    Storage 124    IoT Sensor Set 125 |

Network Module 115

WAN 102

End User Device 103

Remote Server 104

Remote Database 130

Private Cloud 106

Gateway 140

Public Cloud 105

Cloud Orchestration Module 141

Host Physical Machine Set 142

Virtual Machine Set 143

Container Set 144

Network
204

209

206

206

206

206

SAN
208

209

209

210

212

214

216

HOST-SPECIFIC EVENT NOTIFICATION REGISTRATION

BACKGROUND

Field of the Invention

This invention relates to systems and methods for more effectively delivering notifications in data storage environments.

Background of the Invention

When resource consumption thresholds are reached, the DS8000™ enterprise storage system and other storage systems may issue warning notifications to host systems for presentation to users. For most production devices, these notifications are sufficient to inform users of issues that are occurring on the storage systems and provide users the opportunity to address the issues in a timely manner. However, there are many cases in which notifications related to various types of recovery devices, which provide redundancy and resilience in a replication and/or data recovery environment, are not sufficiently surfaced to users. This is primarily due to the fact that recovery devices are frequently kept offline to most or all host systems for addressability and/or security reasons. Unfortunately, this may leave users unaware that their storage environment is no longer in a state that can support full recovery from future error events.

SUMMARY

The invention has been developed in response to the present state of the art and, in particular, in response to the problems and needs in the art that have not yet been fully solved by currently available systems and methods. Accordingly, systems and methods have been developed for more effectively delivering notifications in data storage environments. The features and advantages of the invention will become more fully apparent from the following description and appended claims, or may be learned by practice of the invention as set forth hereinafter.

Consistent with the foregoing, a computer-implemented method for effectively delivering notifications in data storage environments includes, receiving, by a storage controller from a host system, a request to register the host system with the storage controller to receive notifications. These notifications may be associated with a selected type of event detected by the storage controller. In certain embodiments, the selected type of event is a space-related condition associated with a particular storage resource controlled by the storage controller. The computer-implemented method registers the host system with the storage controller. In response to detecting an event of the selected type on the storage controller, the computer-implemented method transmits a notification from the storage controller to the host system to provide notice of the event.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 1 is a high-level block diagram showing one example of a computing system for use in implementing embodiments of the invention;

DETAILED DESCRIPTION

Figure 2:
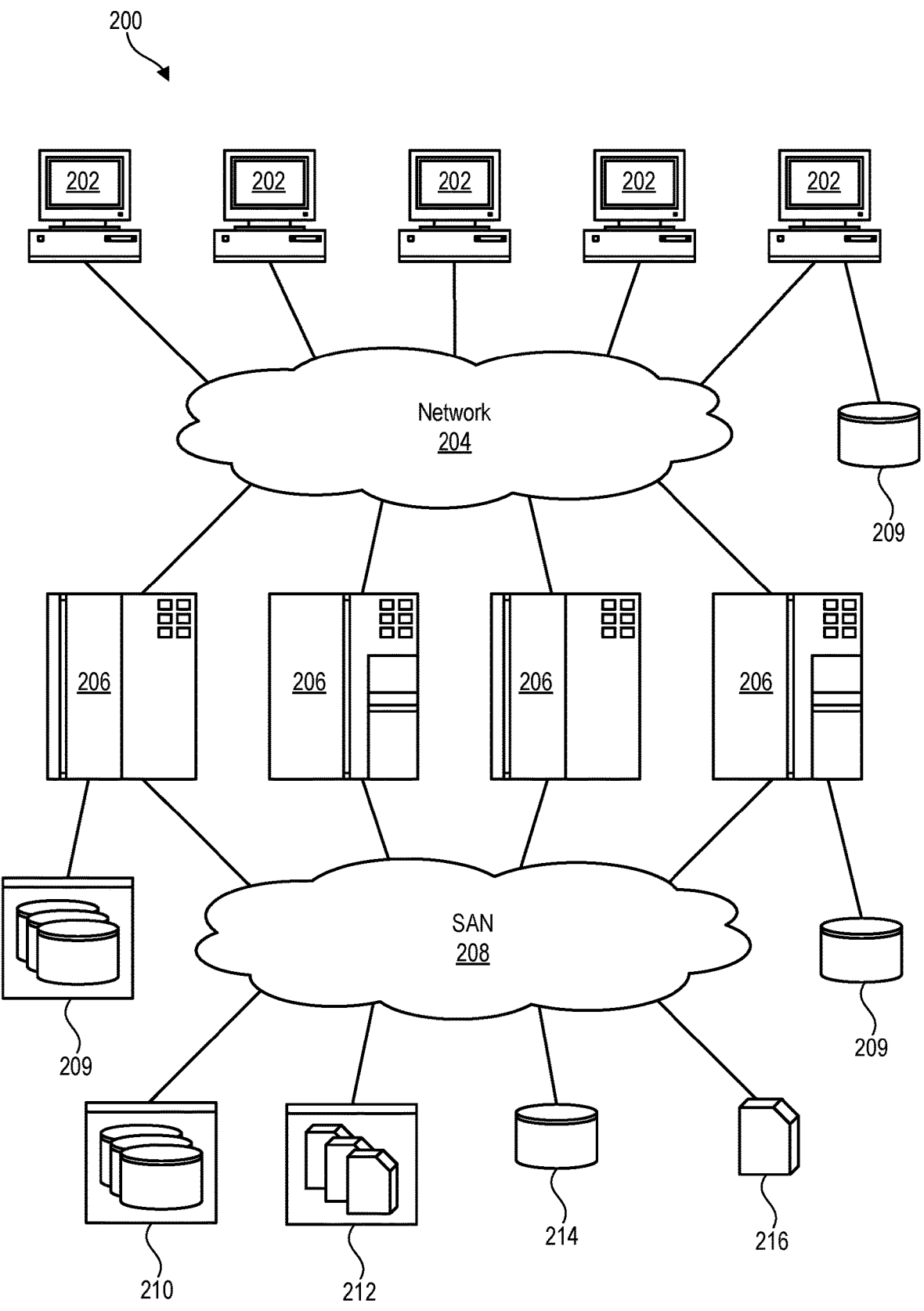
FIG. 2 is a high-level block diagram showing one embodiment of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., a "event notification registration module 150") for more effectively delivering notifications. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, one example of a network environment 200 is illustrated. The network environment 200 is presented to show one example of an environment where systems and methods in accordance with the invention may be implemented. The network environment 200 is presented by way of example and not limitation. Indeed, the systems and methods disclosed herein may be applicable to a wide variety of different network environments in addition to the network environment 200 shown.

As shown, the network environment 200 includes one or more computers 202, 206 interconnected by a network 204. The network 204 may include, for example, a local-area-network (LAN) 204, a wide-area-network (WAN) 204, the Internet 204, an intranet 204, or the like. In certain embodiments, the computers 202, 206 may include both client computers 202 and server computers 206 (also referred to herein as "hosts" 206 or "host systems" 206). In general, the client computers 202 initiate communication sessions, whereas the server computers 206 wait for and respond to requests from the client computers 202. In certain embodiments, the computers 202 and/or servers 206 may connect to one or more internal or external direct-attached storage systems 209 (e.g., arrays of hard-storage drives, solid-state drives, tape drives, etc.). These computers 202, 206 and direct-attached storage systems 209 may communicate using protocols such as ATA, SATA, SCSI, SAS, Fibre Channel, or the like.

The network environment 200 may, in certain embodiments, include a storage network 208 behind the servers 206, such as a storage-area-network (SAN) 208 or a LAN 208 (e.g., when using network-attached storage). This network 208 may connect the servers 206 to one or more storage systems, such as arrays 210 of hard-disk drives or solid-state drives, tape libraries 212, individual hard-disk drives 214 or solid-state drives 214, tape drives 216, CD-ROM libraries, or the like. To access a storage system 210, 212, 214, 216, a host system 206 may communicate over physical connections from one or more ports on the host 206 to one or more ports on the storage system 210, 212, 214, 216. A connection may be through a switch, fabric, direct connection, or the like. In certain embodiments, the servers 206 and storage systems 210, 212, 214, 216 may communicate using a networking standard or protocol such as Fibre Channel (FC) or iSCSI.

Figure 3:
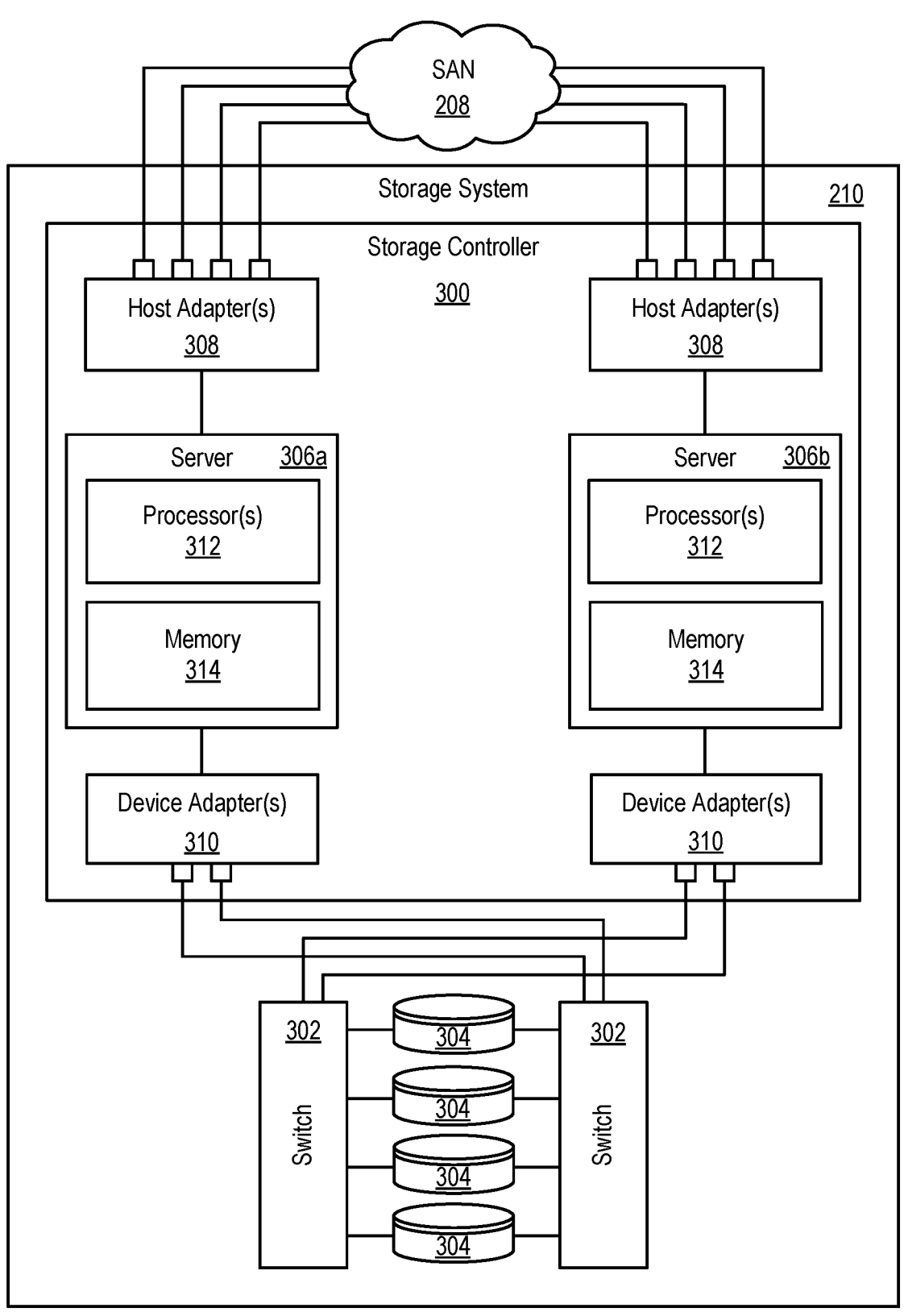
FIG. 3 is a high-level block diagram showing one embodiment a storage system in which a system and method in accordance with the invention may be implemented.

Referring to FIG. 3, one example of a storage system 210 containing an array of hard-disk drives 304 and/or solid-state drives 304 is illustrated. In certain embodiments, all or part of a system and method in accordance with the invention may be implemented within such a storage system 210. As shown, the storage system 210 includes a storage controller 300, one or more switches 302, and one or more storage drives 304, such as hard-disk drives 304 and/or solid-state drives 304 (e.g., flash-memory-based drives 304). The storage controller 300 may enable one or more host systems 206 (e.g., open system and/or mainframe servers 206 running operating systems such z/OS, zVM, or the like) to access data in the one or more storage drives 304.

In selected embodiments, the storage controller 300 includes one or more servers 306a, 306b. The storage controller 300 may also include host adapters 308 and device adapters 310 to connect the storage controller 300 to host devices 206 and storage drives 304, respectively. Multiple servers 306a, 306b may provide redundancy to ensure that data is always available to connected host systems 206. Thus, when one server 306a fails, the other server 306b may pick up the I/O load of the failed server 306a to ensure that I/O is able to continue between the host systems 206 and the storage drives 304. This process may be referred to as a "failover."

In selected embodiments, each server 306 may include one or more processors 312 and memory 314. The memory 314 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 312 and are used to access data in the storage drives 304. These software modules may manage all read and write requests to logical volumes 322 in the storage drives 304.

One example of a storage system 210 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 210, but may be implemented in any comparable or analogous storage system 210, regardless of the manufacturer, product name, or components or component names associated with the system 210. Any storage system that could benefit from one or more embodiments of the invention is deemed to fall within the scope of the invention. Thus, the IBM DS8000™ is presented only by way of example and not limitation.

Figure 4:
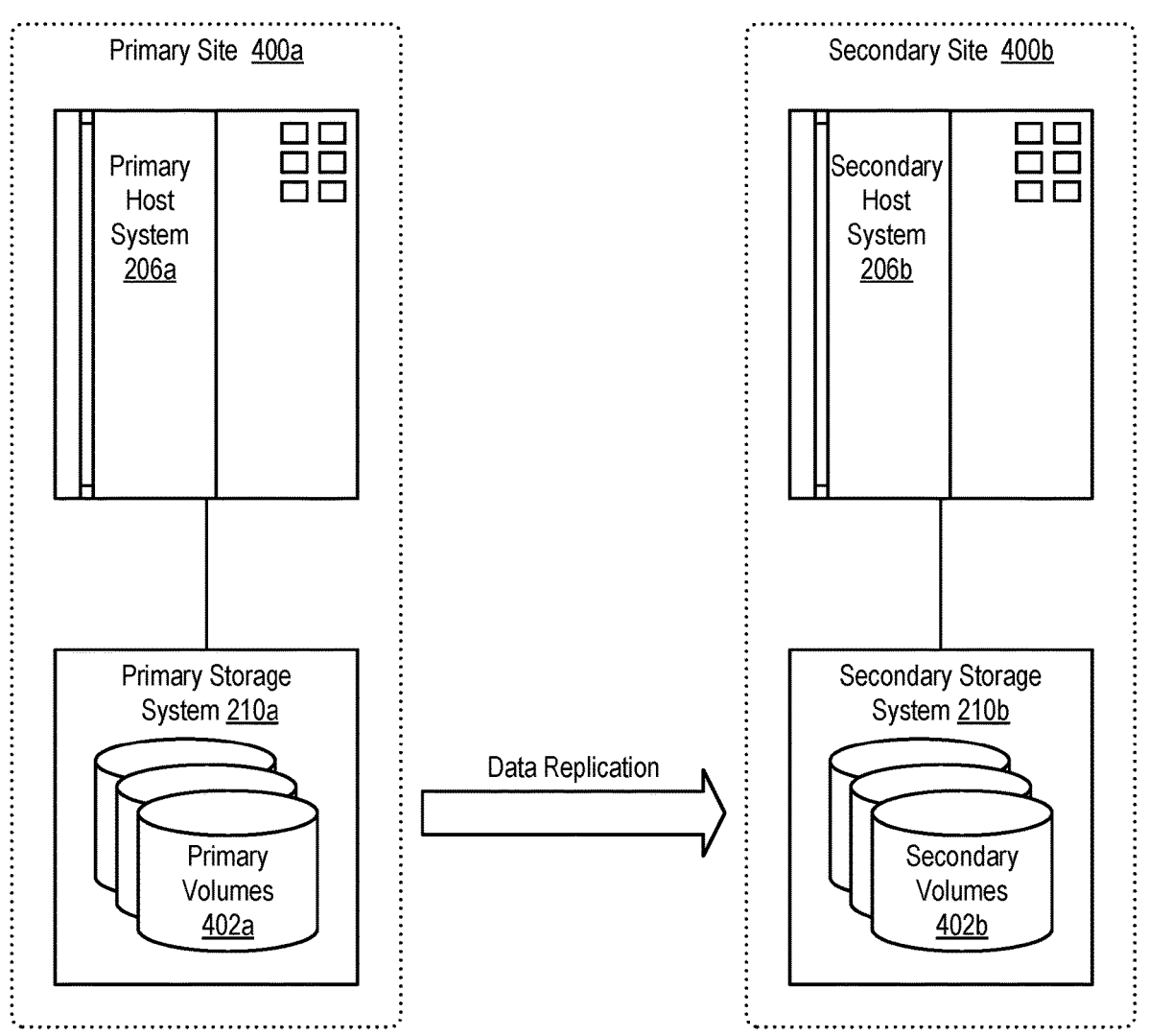
FIG. 4 is a high-level block diagram showing one embodiment of a data replication system in which a system and method in accordance with the invention may be implemented.

Referring to FIG. 4, in certain embodiments, apparatus and methods in accordance with the invention may be implemented in a data replication system such as IBM's Metro or Global Mirror. In such systems, production data may be mirrored from primary volumes 402a on a primary storage system 210a to secondary volumes 402b on a secondary storage system 210b to maintain two consistent copies of the production data. The primary and secondary storage systems 210a, 210b may be located at different sites 400a, 400b, perhaps hundreds or even thousands of miles away from one another. One or more primary host systems 206a may perform I/O on the primary storage system 114a and one or more secondary host systems 206b may perform I/O on the secondary storage system 210b. In the event the primary storage system 210a fails, I/O may be redirected to the secondary storage system 210b (a process referred to as a failover), thereby enabling continuous operations. In certain embodiments, the primary storage system 210a and/or secondary storage system 210b is a storage system such as that illustrated and described in association with FIG. 3.

Figure 5:
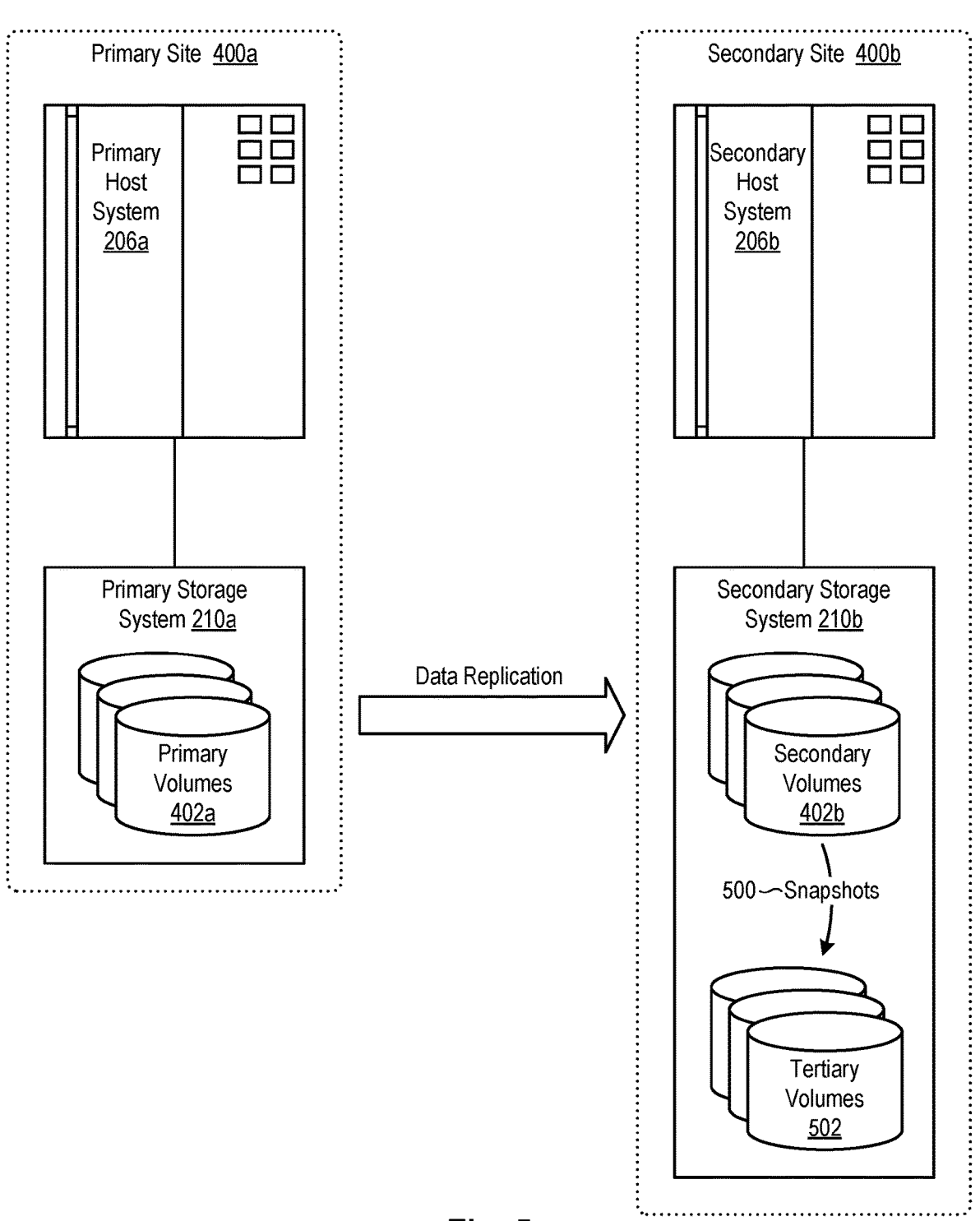
FIG. 5 is a high-level block diagram showing another embodiment of a data replication system in which a system and method in accordance with the invention may be implemented.

FIG. 5 shows an alternative to FIG. 4 wherein snapshots 500 (i.e., point-in-time copies 500) are periodically taken of data in the secondary volumes 402b. These snapshots 500 may be stored in tertiary volumes 502 either at the secondary site 400*b* or at a third site that is remote from the secondary site 400*b*. In certain embodiments, the tertiary volumes 502 are stored on and controlled by the secondary storage system 210*b*.

Figure 6:
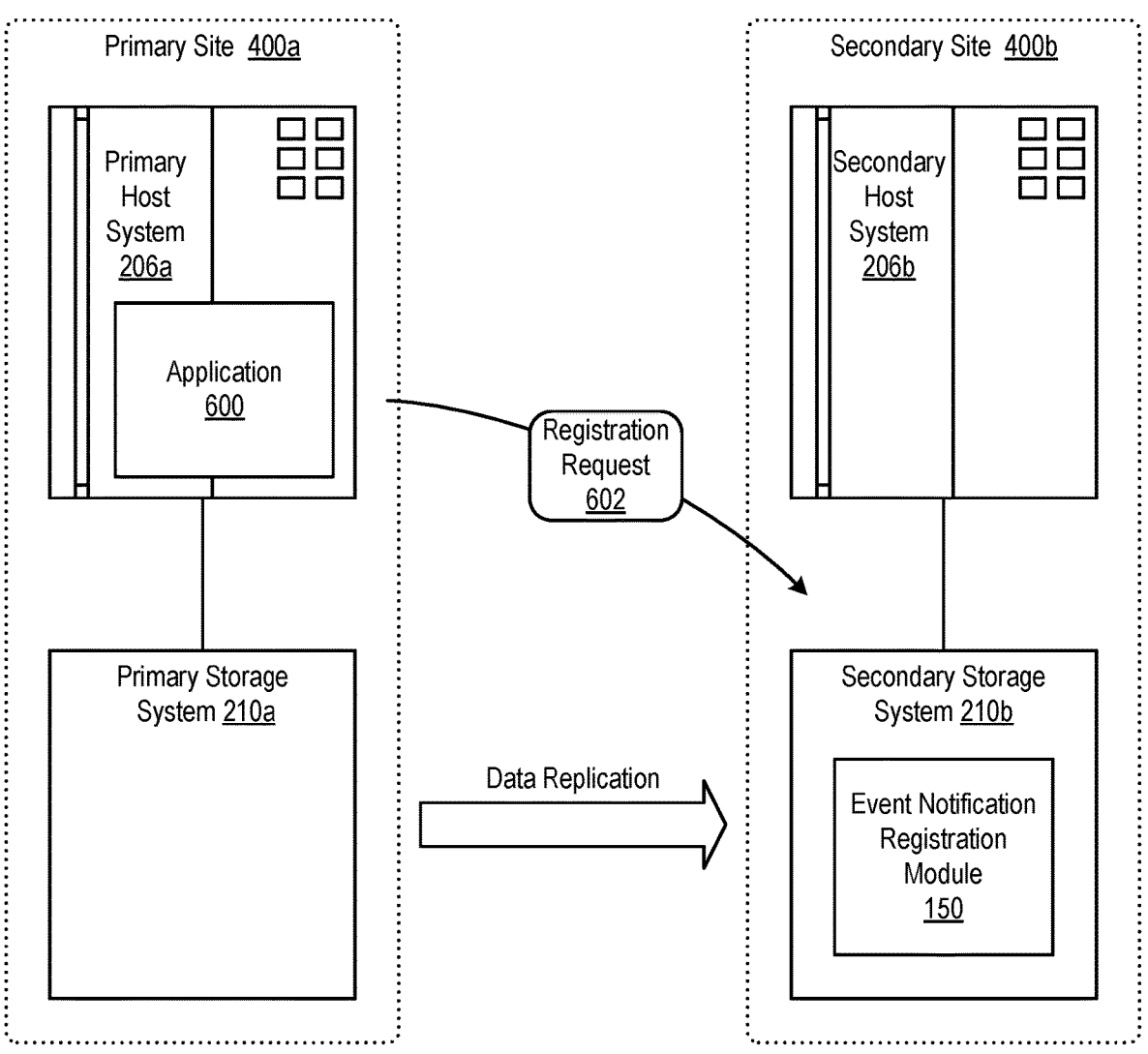
FIG. 6 is a high-level block diagram showing one example of a registration request sent from a host system to a storage controller.
Figure 7:
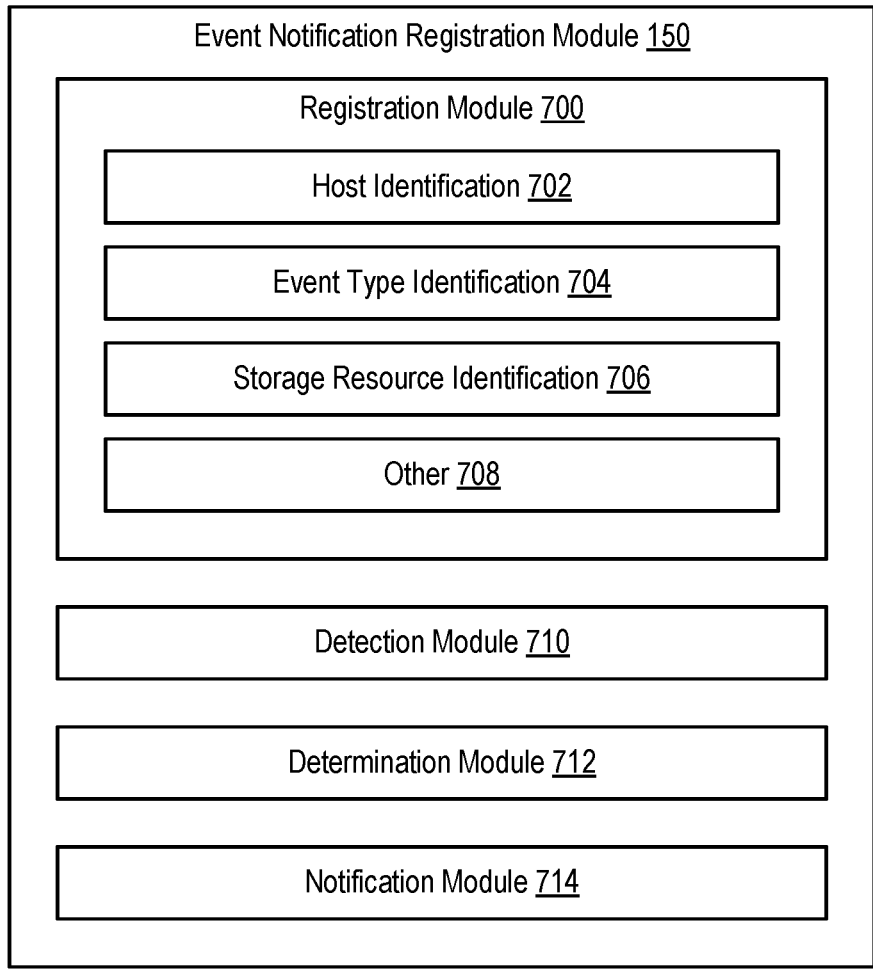
FIG. 7 is a high-level block diagram showing an event notification registration module in accordance with the invention and various sub-modules that may provide various features and functions therein.

Referring to FIG. 6, as previously mentioned, when resource consumption thresholds (e.g., space-related thresholds or conditions) are reached, the DS8000™ enterprise storage system and other storage systems may issue warning notifications to host systems 206 for presentation to users. For most production devices, these notifications are sufficient to inform the users of issues that are occurring on the storage systems 210 and provide users the opportunity to address the issues in a timely manner. However, there are many cases in which notifications related to various types of recovery devices such as the secondary storage system 210*b*, which provide redundancy and resilience in a replication and/or data recovery environment, are not sufficiently surfaced to users. This is primarily due to the fact that recovery devices are frequently kept offline to most or all host systems 206 for addressability and/or security reasons. Unfortunately, this may leave users unaware that their environment is no longer in a state that can support full recovery from future error events.

Currently, when events such as out-of-space conditions or other space-related conditions occur for particular storage resources (e.g., storage drives 304, logical volumes 402, storage arrays 210, logical subsystems (LSSs) etc.), notifications are typically sent to host systems 206 that are grouped (i.e., online) to the storage resources. However, host systems 206 that are not grouped or online with respect to the storage resources may not receive the notifications, even though a communication path or connection may exist between the host systems 206 and storage resources. This can be particularly problematic where a host system 206 is a managing host system 206 that is tasked with managing a disaster recovery environment (such as by setting up pairing relationships, managing point-in-time copies, setting up volumes, etc.) since the managing host system 206 may not be aware of potential issues (e.g., out-of-space conditions, etc.) that need to be addressed to keep the disaster recovery environment functioning as intended. In a worst-case scenario, the disaster recovery environment may be unable to recover from a disaster as intended because these issues were not surfaced to a managing host system 206 in a timely manner for resolution.

In certain embodiments in accordance with the invention, in order to ensure that notifications are adequately surfaced to host systems 206 even when storage resources are offline to the host systems 206 (i.e., not able to be read from and/or written to by the host systems 206), an event notification registration module 150 may be provided in a storage system 210, such as the secondary storage system 210*b*. This event notification registration module 150 may be configured to register particular host systems 206 (e.g., logical hosts, logical partitions (LPARs), operating system (OS) images, etc.) to receive notifications for events occurring on the storage system 210 or storage resources controlled by the storage system 210.

In certain embodiments, when a host system 206 wishes to register itself with a storage system 210 in order to receive notifications, the host system 206 (and more specifically an application 600 such as a management system like GDPS executing on the host system 206) may transmit a request 602 to the storage system 210. The storage system 210 may receive this request 602 and, in response, register the host system 206 with the storage system 210 to receive notifications for particular events occurring on the storage system

210. Alternatively, host systems 206 may be automatically registered for notifications when resources are brought online and an owning application 600 ensures that it brings at least one device online for each set of resources it manages.

In certain embodiments, a registration request 602 may include various parameters that define the scope of the notifications that it wishes to receive. For example, the parameters may designate specific storage resources for which a host system 206 wishes to receive notifications, the types of events for which the host system 206 wishes to receive notifications, the identity (e.g., location, address, name, etc.) of the host system 206 that wishes to receive the notifications, and the like.

In one example, a host system 206 may wish to receive notifications for particular storage resources of a storage system 210 for space-related conditions, such as out-of-space conditions. Such space-related conditions may include, for example, physical space for a space-efficient extent pool or virtual capacity for a Safeguarded Copy Backup volume (i.e., point-in-time-copy) having reached a warning watermark; physical space for a space-efficient extent pool or virtual capacity for a Safeguarded Copy Backup volume having become completely exhausted; and one of the previously listed space-related conditions having been addressed or relieved.

Receiving notifications may enable a host system 206 to take actions such as freeing up storage space, allocating more storage space, redirecting I/O, modifying I/O, etc. to storage resources that are affected by an out-of-space or other space-related condition. The ability to surface notifications to a host system 206, particularly to a managing host system 206 that may not otherwise have access to a storage resource due to the storage resource being offline with respect to the host system 206, may enable more automated management of selected events in the disaster recovery environment as well to mitigate a variety of potentially impactful events.

In certain embodiments, a registration request 602 may be embodied as a DSO (i.e., define subsystem operation) command that will enable a host system 206 to register for all out-of-space or other related events that occur for a given control unit cluster (e.g., control unit server 306, central electronics complex (CEC), node, etc.). It may be up to managing software (GDPS, CSM, etc.) in a host system 206 to ensure that it registers with each cluster (e.g., server 306) for which it wants to receive notifications. When an out-of-space condition occurs in the server 306, the server 306 may send a notification to any and all host systems 206 that have registered with the server 306. This may be in addition to any notifications that the server 306 would normally send to host systems 206 that are grouped or online with respect to the server 306.

Figure 8:
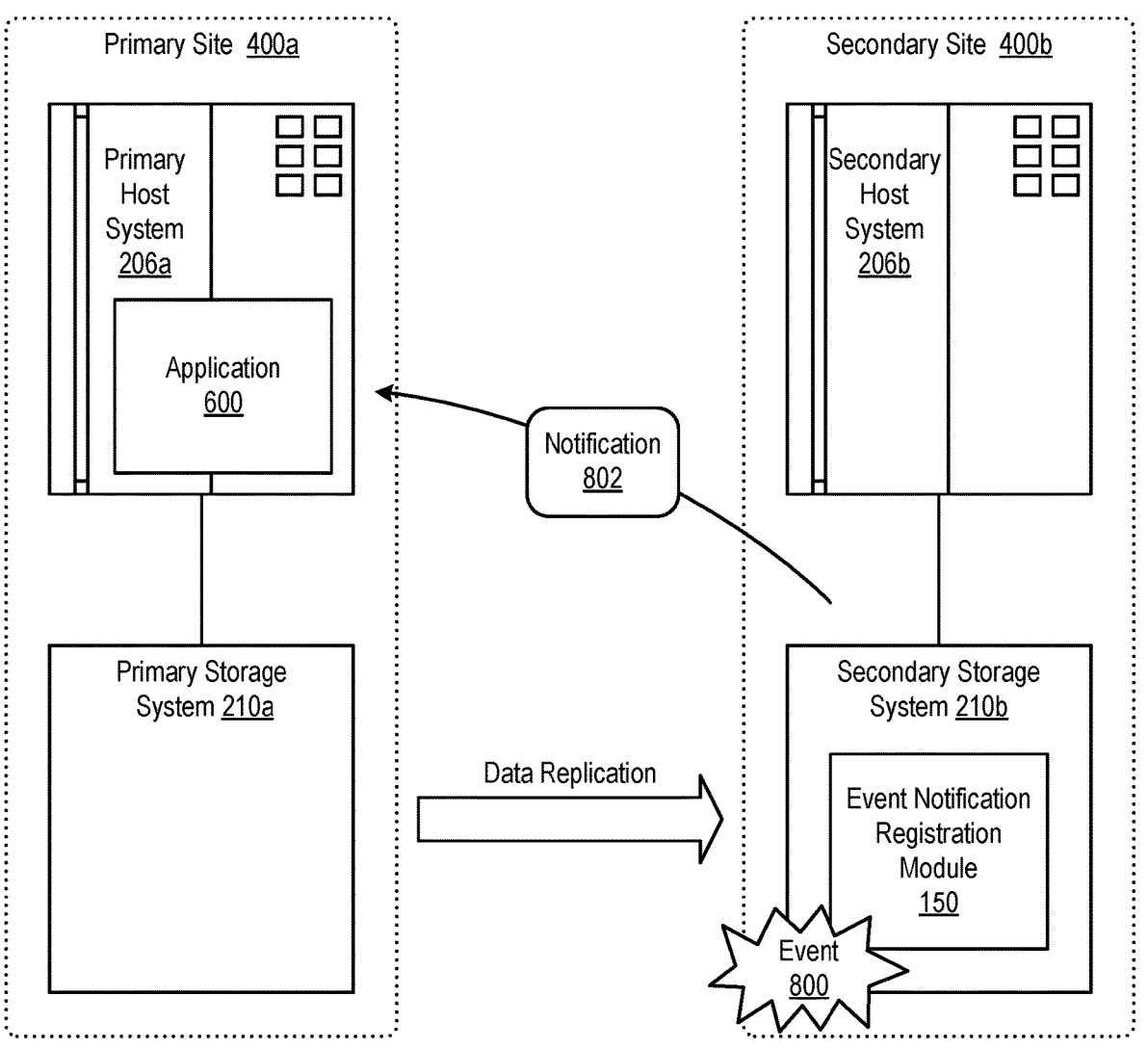
FIG. 8 is a high-level block diagram showing a notification sent from a storage controller to a host system in response to detecting an event at the storage controller.

Referring to FIG. 8, a high-level block diagram showing an event notification registration module 150 and associated sub-modules is illustrated. The event notification registration module 150 and associated sub-modules may be implemented in hardware, software, firmware, or combinations thereof. The event notification registration module 150 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the event notification registration module 150 may include one or more of a registration module 700, detection module 710, determination module 712, and notification module 714. In response to receiving a registration request 602, the registration module 700 may be configured to register a particular host system 206 with the storage system 210 that hosts the event notification registration module 150. In certain embodiments, when registering a particular host system 206, the registration module 700 may identify 702 the host system 206 that is to receive the notifications, identify 704 the types of events for which the host system 206 will be notified, and identify 706 the storage resources for which the host system 206 will be notified of events. In certain embodiments, these parameters are set forth in a registration request 602 that is transmitted from the host system 206 to the storage system 210. In other embodiments, the parameters are set by a user or automatically by default.

The detection module 710 may be configured to detect when an event 800 such as an out-of-space condition occurs on the storage system 210, as shown in FIG. 8. When an event is detected, the determination module 712 may determine the event type and the storage resource for which the event occurred. Based on this information, the determination module 712 may determine whether a host system 206 that has been registered with the storage system 210 should receive a notification. If so, the notification module 714 may send a notification 802 to the host system 206 to provide notice of the event, as also shown in FIG. 8.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer-implemented method for effectively delivering notifications in data storage environments, the method comprising:

receiving, by a storage controller from a host system, a request to register the host system with the storage controller to receive notifications associated with a selected type of event detected by the storage controller;

registering, by the storage controller, the host system;

detecting an event of the selected type on the storage controller associated with a storage resource that is offline with respect to the host system; and notifying, by the storage controller, the host system of the event associated with the storage resource that is offline with respect to the host system.

2. The method of claim 1, wherein receiving the request from the host system comprises receiving the request from an application on the host system.

3. The method of claim 1, wherein an application manages the storage resource.

4. The method of claim 1, wherein the event is a space-related condition associated with the storage resource.

5. The method of claim 4, wherein the event is an out-of-space condition associated with the storage resource.

6. The method of claim 1, wherein the request comprises at least one parameter that designates types of events for which the host system is to receive notifications.

7. A computer program product comprising:

one or more computer readable storage media; and program instructions stored on the one or more computer readable storage media to perform operations comprising:

receiving, by a storage controller from a host system, a request to register the host system with the storage controller to receive notifications associated with a selected type of event detected by the storage controller;

registering, by the storage controller, the host system;

detecting an event of the selected type on the storage controller associated with a storage resource that is offline with respect to the host system; and notifying, by the storage controller, the host system of the event associated with the storage resource that is offline with respect to the host system.

8. The computer program product of claim 7, wherein receiving the request from the host system comprises receiving the request from an application on the host system.

9. The computer program product of claim 8, wherein an application manages the storage resource.

10. The computer program product of claim 7, wherein the event is a space-related condition associated with the particular storage resource.

11. The computer program product of claim 7, wherein the event is an out-of-space condition associated with the storage resource.

12. The computer program product of claim 7, wherein the request comprises at least one parameter that designates types of events for which the host system is to receive notifications.

13. A system for effectively delivering notifications in data storage environments, the system comprising:

processor set;

one or more computer readable storage media; and program instructions stored on the one or more computer readable storage media to cause the processor set to perform operations comprising:

receiving, by a storage controller from a host system, a request to register the host system with the storage controller to receive notifications associated with a selected type of event detected by the storage controller;

registering, by the storage controller, the host system;

detecting an event of the selected type on the storage controller associated with a storage resource that is offline with respect to the host system; and notifying, by the storage controller, the host system of the event associated with the storage resource that is offline with respect to the host system.

14. The system of claim 13, wherein receiving the request from the host system comprises receiving the request from an application on the host system.

15. The system of claim 13, wherein an application manages the storage resource.

16. The system of claim 13, wherein the event is a space-related condition associated with the storage resource.

17. The system of claim 13, wherein the request comprises at least one parameter that designates types of events for which the host system is to receive notifications.

\* \* \* \* \*